United States Patent [19]
Bornhorst et al.

[11] Patent Number: 5,969,868
[45] Date of Patent: Oct. 19, 1999

[54] SEQUENTIAL CROSS-FADING COLOR FILTERS AND SYSTEM

[75] Inventors: James M. Bornhorst, Desoto; Richard W. Hutton, Dallas, both of Tex.

[73] Assignee: Vari-Lite, Inc., Dallas, Tex.

[21] Appl. No.: 09/072,703

[22] Filed: May 5, 1998

Related U.S. Application Data

[63] Continuation-in-part of application No. 08/927,917, Sep. 11, 1997, Pat. No. 5,825,548.

[51] Int. Cl.⁶ .................................. G02B 5/28; F21V 9/10
[52] U.S. Cl. ....................... 359/589; 359/590; 362/268; 362/293
[58] Field of Search ................................ 359/589, 578, 359/577, 590, 889, 890, 891, 892; 362/268, 293

[56] References Cited

U.S. PATENT DOCUMENTS

| | | | |
|---|---|---|---|
| 4,392,187 | 7/1983 | Bornhorst | 362/233 |
| 4,418,996 | 12/1983 | Bellar et al. | 353/33 |
| 4,602,321 | 7/1986 | Bornhorst | 362/268 |
| 4,697,770 | 10/1987 | Kirschner | 248/62 |
| 4,800,474 | 1/1989 | Bornhorst | 362/293 |
| 4,811,182 | 3/1989 | Solomon | 362/293 |
| 4,893,225 | 1/1990 | Solomon | 362/293 |
| 4,894,760 | 1/1990 | Callahan | 362/293 |
| 4,914,556 | 4/1990 | Richardson | 362/293 |
| 4,958,265 | 9/1990 | Solomon | 362/293 |
| 4,984,143 | 1/1991 | Richardson | 362/293 |
| 5,031,078 | 7/1991 | Bornhorst | 362/32 |
| 5,126,886 | 6/1992 | Richardson et al. | 359/888 |
| 5,188,452 | 2/1993 | Ryan | 362/293 |
| 5,282,121 | 1/1994 | Bornhorst et al. | 362/294 |
| 5,311,791 | 5/1994 | Yanagisawa | 74/479 PH |
| 5,426,576 | 6/1995 | Hewlett | 362/293 |
| 5,825,548 | 10/1998 | Bornhorst et al. | 359/578 |

*Primary Examiner*—Jon Henry
*Attorney, Agent, or Firm*—Hughes & Luce, L.L.P.

[57] ABSTRACT

A color filter plate includes a continuously-variable dichroic filter coating constituting a variable band-pass or variable band-reject filter having a spatially-modulated variable-density pattern formed in the coating, and provides continuously-variable hue and saturation characteristics along separate gradient axes. A color filter mechanism includes a sequential arrangement of rectangular or circular color filters, having continuously-variable band-pass or band-reject filter coatings, mounted in motorized carriages. One mechanism provides two-axis translation of the rectangular color filters while another mechanism provides translation and rotation of the circular color filters. A light projection system comprising a lamp with a reflector and a lens includes a color filter mechanism having sequential, continuously-variable band-pass and band-reject filters supported by motorized carriages mounted in a region where the beam diameter is small.

17 Claims, 8 Drawing Sheets

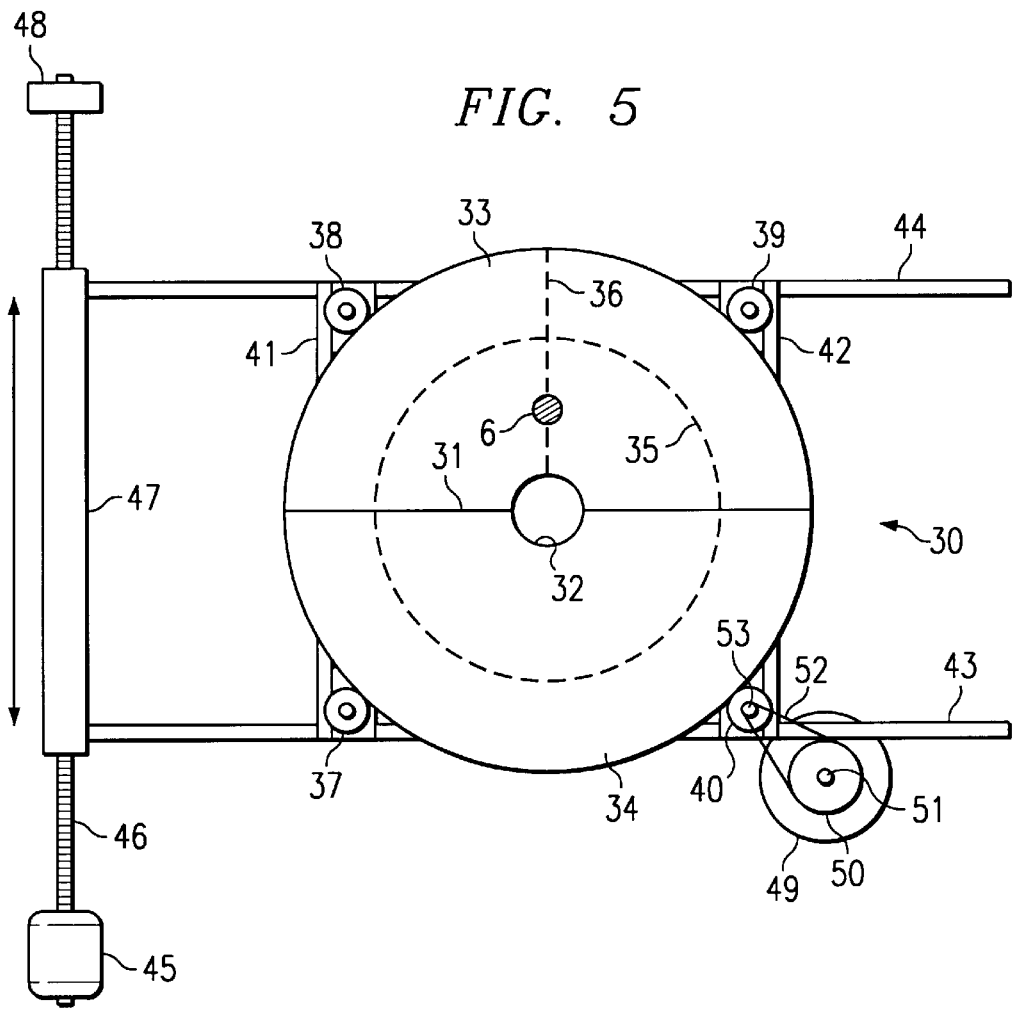
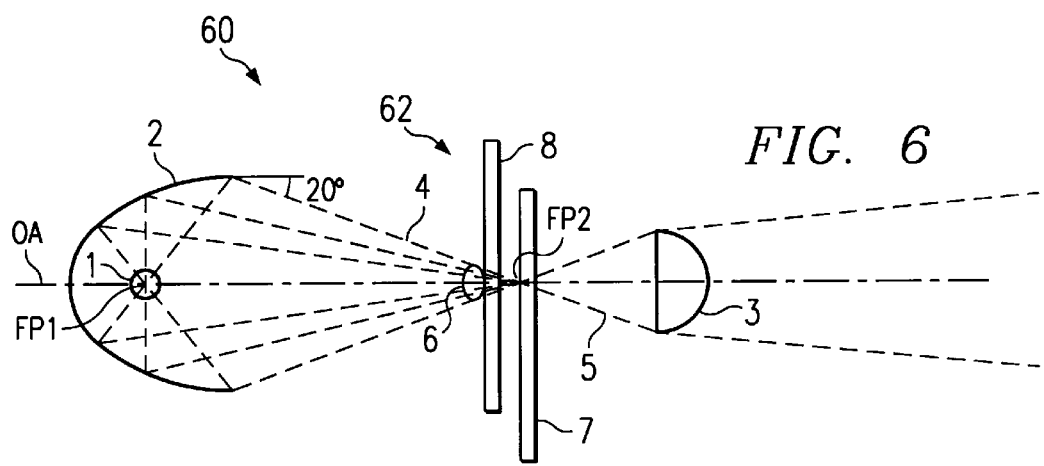

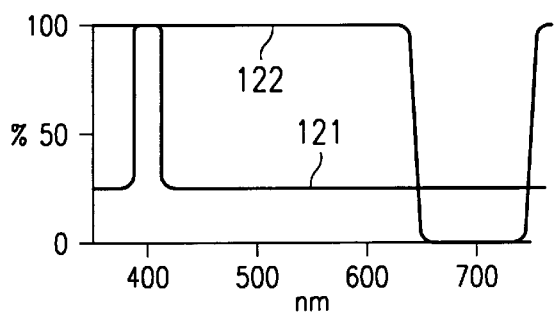
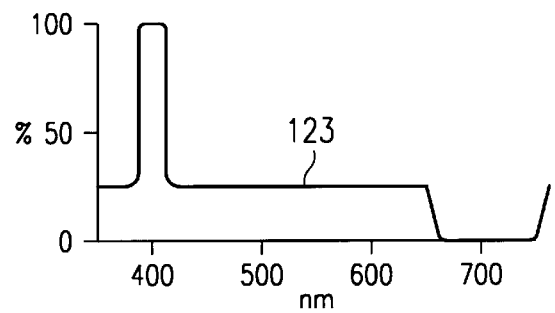
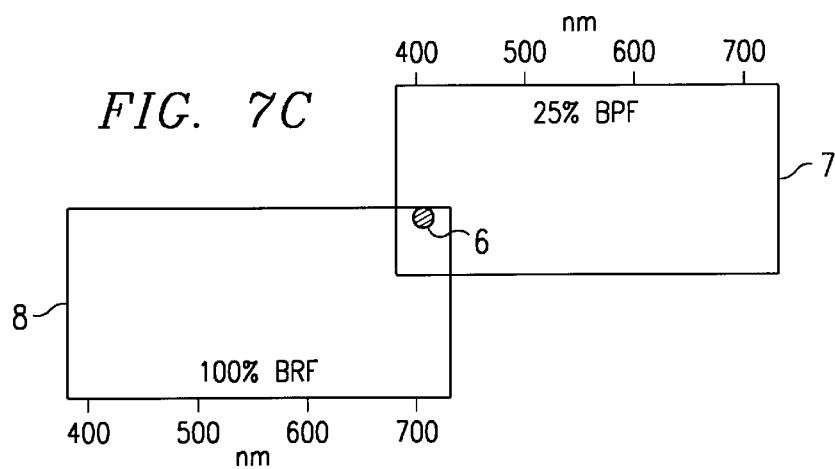
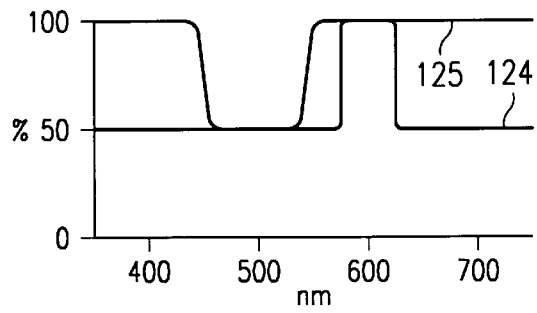
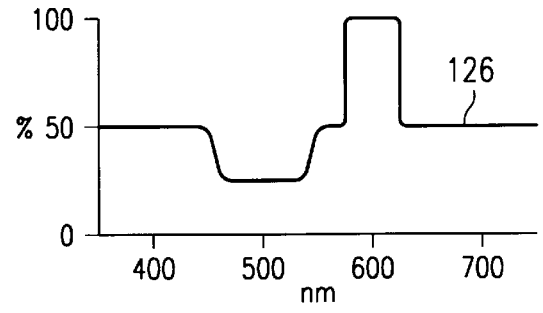
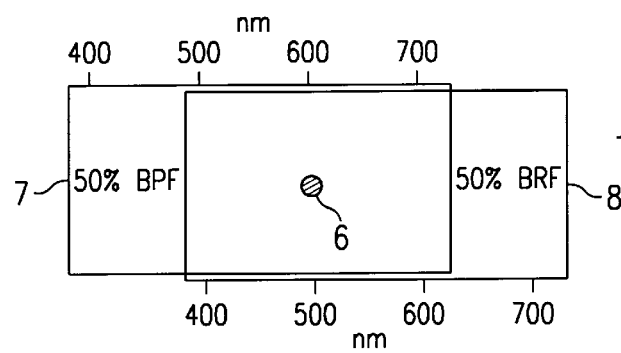

5,969,868

SEQUENTIAL CROSS-FADING COLOR FILTERS AND SYSTEM

BACKGROUND OF THE INVENTION

1. Field of the Invention

The present invention is a Continuation-in-Part of U.S. patent application Ser. No. 08/927,917 filed Sep. 11, 1997, now U.S. Pat. No. 5,825,548 and relates generally to stage lighting instruments having associated color-changing mechanisms and particularly to a light source including planar, selected-wavelength modifiers that are adjustable in the plane of the modifier.

2. Description of Related Art

Prior art stage lighting instruments can generally be classified as either spot lights or as flood (or wash) lights, the former projecting an image through a lens as a focused spot of light, the latter directing a non-focused beam of light towards a general area to be illuminated. Various techniques for imparting a particular color to the light beam have been devised, and may depend in part upon the optical system used in a particular spot light or wash light. The earliest known technique utilized a color filter medium, such as a glass container filled with colored water, a sheet of colored gelatin or a sheet of colored plastic, which was placed in front of the light source such that the light beam passed through the filter and was colored thereby. These early filters were required to be large enough to cover the beam, usually being placed across the exit aperture of a luminaire, which is generally the coolest and most easily accessible part still in the light path of the luminaire.

Several techniques have been disclosed for changing the color of a light beam through the use of dichroic filters placed in the beam. For example, reference is made to U.S. Pat. Nos. 4,392,187; 4,602,321; 4,800,474; 4,914,556; 4,984,143; 5,126,886; 4,811,182; 4,893,225; 4,897,770; 4,958,265; 4,894,760; 5,188,452; 4,418,996; 5,282,121; and 5,426,576.

There are, however, several reasons for improving the color changing technology for focused-beam luminaires. The region of the optical system in which the beam has a relatively small diameter is itself relatively small longitudinally, and there are several devices for which that region is the optimum location, including a projection gate for image pattern generators (gobos), a variable aperture mechanism (beam size iris, shutters), and color filter exchanging mechanisms (color wheels). Also, there is the desire to minimize losses through the optical system by reducing the number of surfaces through which the light beam is transmitted before exiting the luminaire. Whereas all previous systems allowed independent variation of saturation with constant hue, or simultaneous variation of color and saturation in a single filter, no previous system shows independent control of saturation and/or hue with a single filter. Therefore, a need exists to provide a color filter apparatus having continuously and independently adjustable hue and saturation in both spectral colors (each comprising a contiguous band of visible light wavelengths) and complex colors (each comprising two or more noncontiguous bands of wavelengths), providing saturation control by adjustable band width control and by mixing of broad band white light with narrow band width spectral color light, and to do so with a minimal number of filter elements.

SUMMARY OF THE INVENTION

In a preferred embodiment, a color filter mechanism includes a first color filter plate having a continuously-variable band pass (CVBP) dichroic filter coating and a second color filter plate having a continuously-variable band reject (CVBR) dichroic filter coating, each of the filter coatings having hue characteristic that varies along a first gradient axis of the plate and having saturation characteristic that varies along a second gradient axis of the plate. The filter coatings of each color filter plate have a thickness that varies along the first gradient axis and a density that varies along the second gradient axis; the thickness and density preferably vary continuously along their respective axes. The two color filter plates are arranged sequentially along the path of a light beam, each filter plate being mounted in a carriage moveable in two axes of a plane. The plane of movement is preferably normal to the axis of the light beam.

In another embodiment, a color filter mechanism includes first and second circular color filter plates having CVBP and CVBR filter coatings, respectively, arranged sequentially along the path of a light beam, each filter plate being mounted in a carriage moveable in at least one axis of a plane, the filter also being rotatable about an axis of rotation. The plane of movement is preferably normal to the axis of a light beam passing through the plane of the filter plate and the axis of rotation is approximately parallel to the axis of the light beam.

BRIEF DESCRIPTION OF THE DRAWINGS

FIG. 5 is a plan view of another color filter plate according to a second embodiment;

FIG. 6 is a plan view of another schematic side elevation of an optical system for a spot luminaire;

FIGS. 7A–7C illustrate the composite spectral response of two sequential filters and the relative positions thereof; and FIGS. 8A–8C illustrate the composite spectral response of two sequential filters and the relative positions thereof.

DETAILED DESCRIPTION

Figure 1:
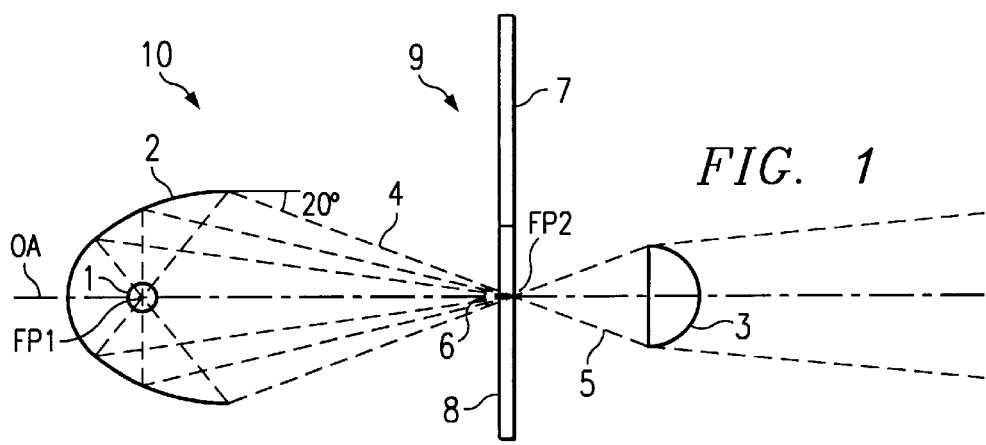
FIG. 1 is a schematic side elevation of an optical system for a spot luminaire.

As shown in FIG. 1, an optical system 10 for a spot luminaire includes a light source 1 located at a first focal point FP1 of an elliptical reflector 2, a cross-fading color filter assembly 9 including a color filter plate in accordance with the present invention, and a projection lens 3. When energized, light source 1, in cooperation with reflector 2, projects a beam of light along optical axis OA passing through focal points FP1 and FP2. The profile of the elliptical reflector is chosen to produce an illumination cone 4 having a shallow angle and illuminate a small spot on a color filter plate of the color filter mechanism. The half-angle of illumination cone 4 measured between optical axis OA and a boundary of the cone, is preferably about 20 degrees as shown in FIG. 1 (the half-angle, for convenience, being shown between a boundary of the cone and another line drawn parallel to axis OA), although a practical system may use an illumination cone having a half-angle of up to approximately 30 degrees. The projection lens is located to intercept diverging light rays having passed through a second focal point FP2 of the reflector, and is designed to project light rays that approach the lens within cone angle 5 which generally matches the acceptance angle of the lens. Alternatively, lens 3 can be replaced with a Fresnel lens to produce an optical system for a wash luminaire. The color filter mechanism is located near the second focal point of the reflector, at a place where the beam diameter is small and produces a small spot of light 6 incident on a color filter plate.

Figure 2:
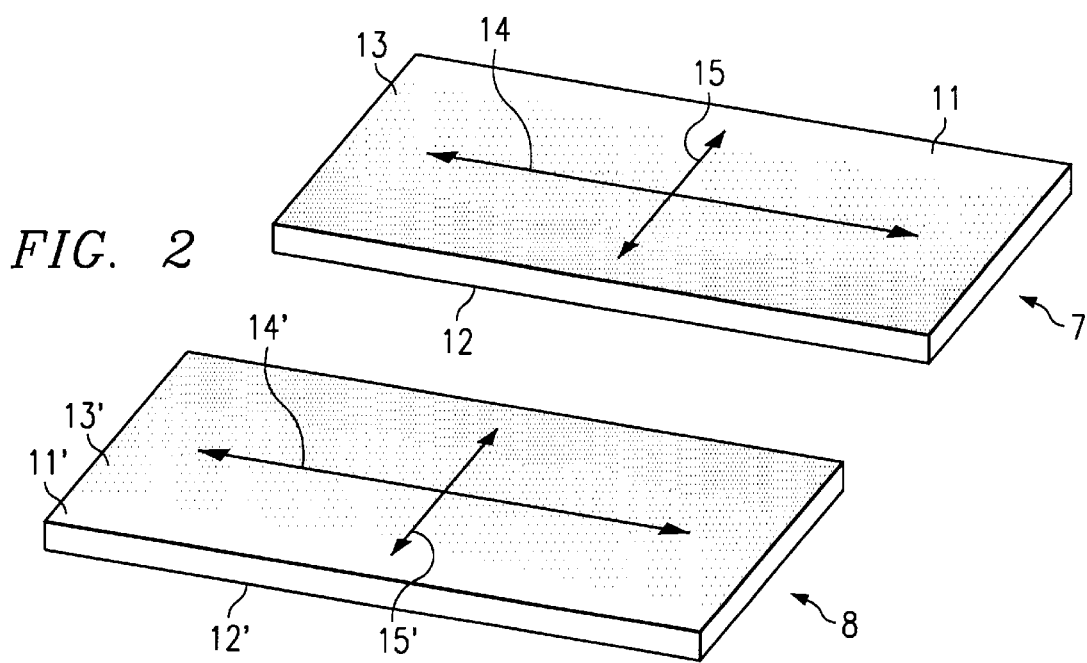
FIG. 2 is a plan view of a color filter plate according to the present invention.

As shown in FIG. 2, a color filter plate 7 according to one aspect of the present invention, comprises a spatially-modulated, multi-layer, thin-film, dielectric coating 11 deposited on a transparent substrate 12 to form an interference or dichroic filter having a variable band-pass characteristic. The substrate is generally rectangular and is composed of a high-temperature glass or other transparent material resistant to heat. The various layers of dielectric materials have different indices of refraction and thickness, the thickness being varied over the filter surface to produce continuously variable or substantially continuously variable spectral responses. Preferably the thickness of each layer of dielectric material is continuously or substantially continuously varied across the surface of the substrate, being generally thinner at one end of the plate and being generally thicker at an opposite end of the substrate. The dichroic filter coating is spatially-modulated with a variable-density half-tone or dot-density pattern 13 formed in the coating, the density being varied over the filter surface to produce continuously variable or substantially continuously variable color saturation. Preferably the density of the pattern is continuously or substantially continuously varied across the surface of the substrate, being generally denser at one end of the substrate and being generally less dense at an opposite end of the substrate. The parameters of the coating material, which affect the perceived hue of a colored light beam passing through the filter, are varied along a first gradient axis 14 of the color filter plate while the density of the pattern formed in the coating, which affects the color saturation of the light beam, is varied along a second gradient axis 15 of the color filter plate. In a preferred embodiment, the first and second gradient axes are orthogonal to the rectangular profile of the transparent substrate upon which the color filter coating is deposited.

A second color filter plate 8, according to another aspect of the invention, comprises another spatially-modulated, multi-layer, thin-film, dielectric coating 11' deposited on another transparent substrate 12' to form another interference or dichroic filter. Whereas coating 11 forms a variable band-pass dichroic filter, coating 11' is formulated to provide a variable band-reject dichroic filter. Coating 11' is also spatially-modulated with a variable-density half-tone or dot-density pattern 13' formed in the coating, the density being varied over the filter surface to produce continuously variable or substantially continuously variable color saturation. The parameters of the coating material, which affect the perceived hue of a colored light beam passing through the filter, are varied along a first gradient axis 14' of the color filter plate while the density of the pattern formed in the coating, which affects the color saturation of the light beam, is varied along a second gradient axis 15' of the color filter plate. In a preferred embodiment, the first and second gradient axes are again orthogonal to the rectangular profile of the transparent substrate upon which the color filter coating is deposited.

Figure 3A:
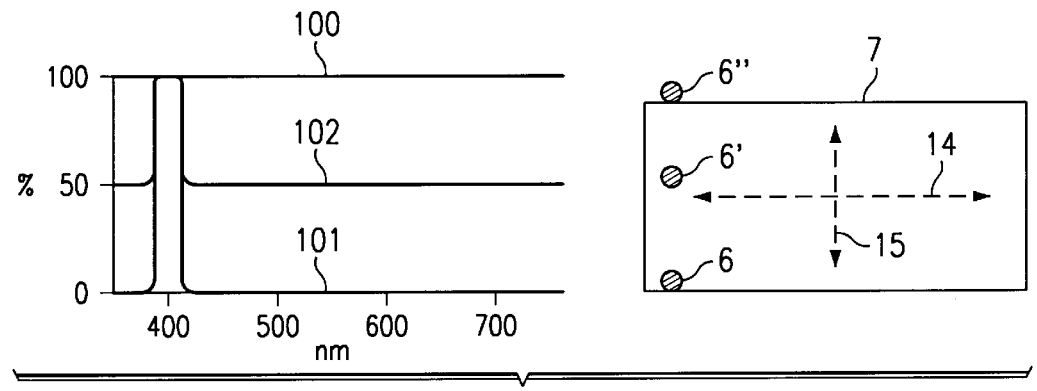
FIGS. 3A–3H comprise a set of spectral response curves illustrating certain properties of the color filter plates of the present invention.

As shown in FIGS. 3A–3H, the spectral response of the color filter plate varies depending upon the area of the plate through which the light beam passes. The color filter plate of the present invention can be constructed as a continuously-variable or substantially continuously variable band pass (CVBP) filter 7 or as a continuously-variable or substantially continuously variable band reject (CVBR) filter 8. A band width can be specified as a percentage of a center wavelength. As a band pass filter, the color filter plate transmits wavelengths within the pass band width and reflects all other visible wavelengths. As a band reject filter, the color plate reflects wavelengths within the reject band width and transmits all other visible wavelengths. In particular, and in accordance with a preferred embodiment of the present invention, FIG. 3A shows two spectral response curves of band-pass filter plate 7 with a spot of light 6 incident on the filter plate at a first location along the hue axis, and with a spot of light 6' incident on the filter plate at a corresponding location displaced along the saturation axis. With the spot 6 at a location in a densely-coated, fully-saturated region of the filter plate 7, the color of light transmitted therethrough is represented by spectral response curve 101, which shows a narrow band of transmitted wavelengths approximately centered around 400 nm. The band width, for purposes of illustration, is approximately 10% of the center wavelength, or 40 nm band width at 400 nm center wavelength. Transmittance within the band is at about 100% while transmittance outside the band in nearly 0%. With the spot 6' at a location in a less densely-coated, less-saturated region of the filter plate 7, the color of light transmitted therethrough is represented by spectral response curve 102, which shows a narrow band of approximately 100% transmittance approximately centered around 400 nm, but with approximately 50% transmittance of other wavelengths outside the band. This second position of the spot of light 6', is achieved by moving the filter plate in one direction, along the saturation axis 15, while holding the position of the plate constant with respect to the hue axis 14. Note that the filter plate can be moved out of the beam path so that a spot of light 6" is not incident upon the filter plate, thereby providing un-filtered, white light, which is represented by curve 100 showing 100% transmittance throughout the range of visible light.

Figure 3B:
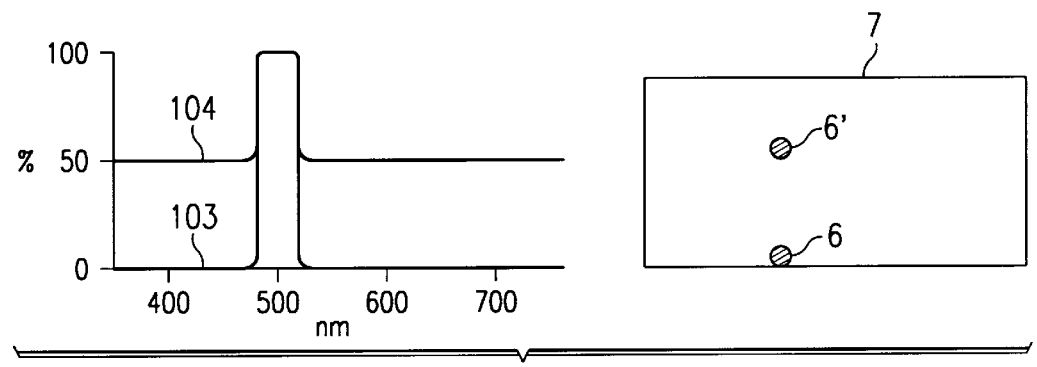

FIG. 3B shows spectral response curves of filter plate 7 with the spot 6 incident at a second point along the hue axis and with spot 6' at a corresponding point displaced along the saturation axis. With the spot 6 at a location in a densely-coated, fully-saturated region of the filter plate 7, the color of light transmitted therethrough is represented by spectral response curve 103, which shows a narrow band of approximately 100% transmittance approximately centered around 500 nm, transmittance outside the band being nearly 0%. With the spot 6' at a location in a less densely-coated, less-saturated region of the filter plate 7, the color of light transmitted therethrough is represented by spectral response curve 104, which shows a narrow band of approximately 100% transmittance approximately centered around 500 nm, but with approximately 50% transmittance of other wavelengths outside the band. Note that as the filter plate 7 is translated across the beam path along the hue axis, the spot of light 6 moves from the location shown in FIG. 3A to the location shown in FIG. 3B, and the spectral response varies continuously from that of response curve 101 to that of response curve 103. Again, the filter plate can be translated along the saturation axis to locate the spot of light in less densely saturated regions, such as represented by spot 6' in FIG. 3B, as desired. The filter plate can be translated along either or both the hue and/or saturation axes simultaneously as desired.

Figure 3C:
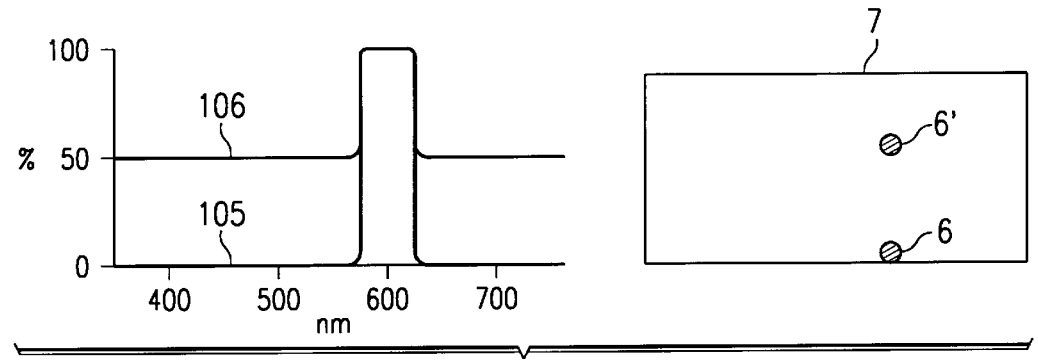

FIG. 3C shows the spot of light 6 at a third location along the hue axis and spot 6' at a corresponding location displaced along the saturation axis. The color of light transmitted through the filter plate at spot 6 is represented by spectral response curve 105, which shows a narrow band of approximately 100% transmittance approximately centered around 600 nm, transmittance outside the band being nearly 0%. The color of light transmitted through the filter plate a spot 6' is represented by spectral response curve 106, which shows a narrow band of approximately 100% transmittance approximately centered around 600 nm, but with approximately 50% transmittance of other wavelengths outside the band.

Figure 3D:
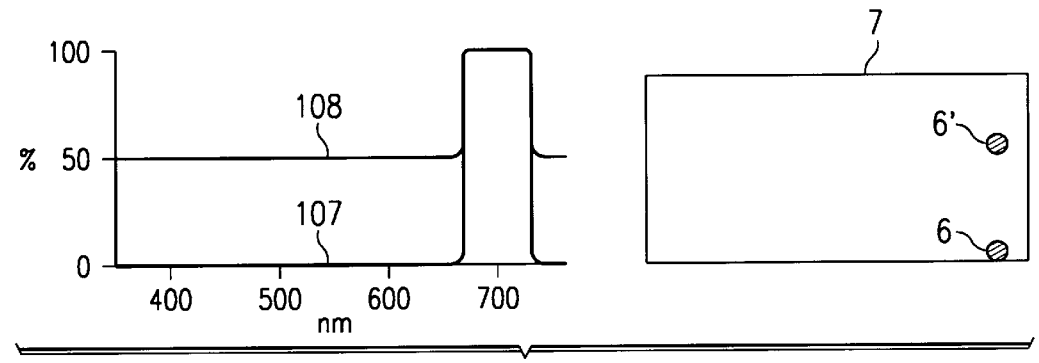

FIG. 3D shows the spot of light 6 at a fourth location along the hue axis and spot 6' at a corresponding location displaced along the saturation axis. The color of light transmitted through the filter plate at spot 6 is represented by spectral response curve 107, which shows a narrow band of approximately 100% transmittance approximately centered around 700 nm, transmittance outside the band being nearly 0%. The color of light transmitted through the filter plate a spot 6' is represented by spectral response curve 108, which shows a narrow band of approximately 100% transmittance approximately centered around 700 nm, but with approximately 50% transmittance of other wavelengths outside the band.

Figure 3E:
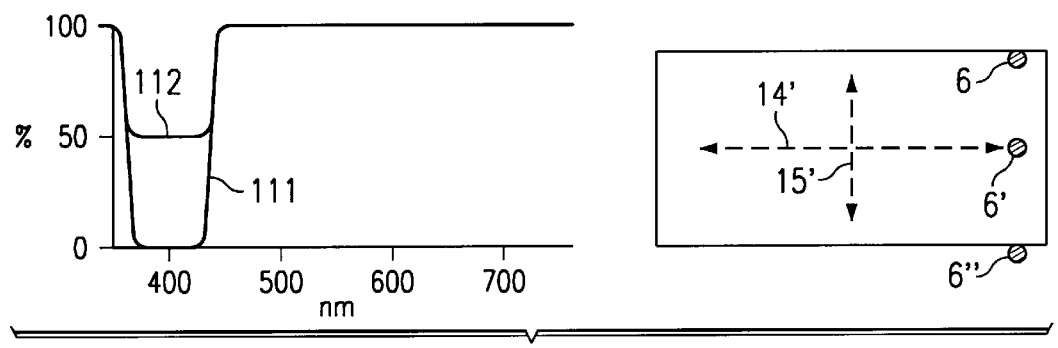

FIG. 3E shows two spectral response curves of band-reject filter plate 8 with a spot of light 6 incident on the filter plate at a first location along the hue axis, and with a spot of light 6' incident on the filter plate at a corresponding location displaced along the saturation axis. With the spot 6 at a location in a densely-coated, fully-saturated region of the filter plate 8, the color of light transmitted therethrough is represented by spectral response curve 111, which shows a narrow band of rejected wavelengths approximately centered around 400 nm. The band width, for purposes of illustration, is approximately 20% of the center wavelength, or 80 nm band width at 400 nm center wavelength. Transmittance within the band is at about 0% while transmittance outside the band in nearly 100%. With the spot 6' at a location in a less densely-coated, less-saturated region of the filter plate 8, the color of light transmitted therethrough is represented by spectral response curve 112, which shows a narrow band of approximately 50% transmittance approximately centered around 400 nm, but with approximately 100% transmittance of other wavelengths outside the band. This second position of the spot of light 6', is achieved by moving the filter plate in one direction, along the saturation axis 15, while holding the position of the plate constant with respect to the hue axis 14. Note that the filter plate can be moved out of the beam path so that a spot of light 6" is not incident upon the filter plate, thereby providing un-filtered, white light.

Figure 3F:
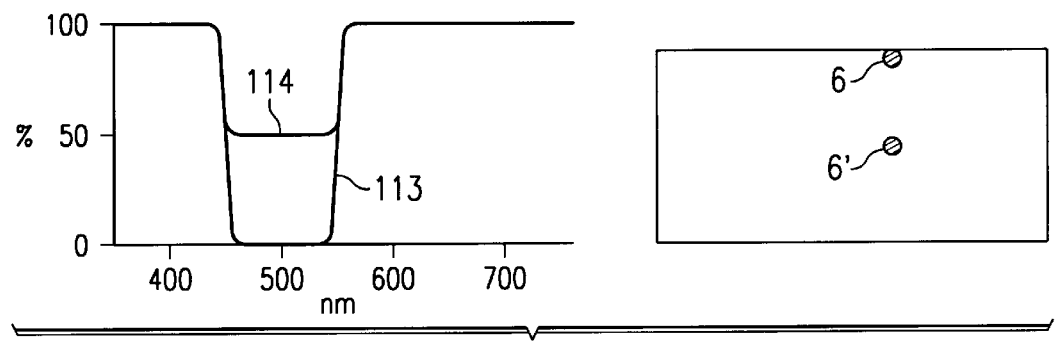

FIG. 3F shows spectral response curves of filter plate 8 with the spot 6 incident at a second point along the hue axis and with spot 6' at a corresponding point displaced along the saturation axis. With the spot 6 at a location in a densely-coated, fully-saturated region of the filter plate 8, the color of light transmitted therethrough is represented by spectral response curve 113, which shows a narrow band of approximately 0% transmittance approximately centered around 500 nm, transmittance outside the band being nearly 100%. With the spot 6' at a location in a less densely-coated, less-saturated region of the filter plate 8, the color of light transmitted therethrough is represented by spectral response curve 114, which shows a narrow band of approximately 50% transmittance approximately centered around 500 nm, but with approximately 100% transmittance of other wavelengths outside the band. Note that as the filter plate 8 is translated across the beam path along the hue axis, the spot of light 6 moves from the location shown in FIG. 3E to the location shown in FIG. 3F, and the spectral response varies continuously from that of response curve 111 to that of response curve 113. Again, the filter plate can be translated along the saturation axis to locate the spot of light in less densely saturated regions, such as represented by spot 6' in FIG. 3F, as desired. The filter plate can be translated along either or both the hue and/or saturation axes simultaneously as desired.

Figure 3G:
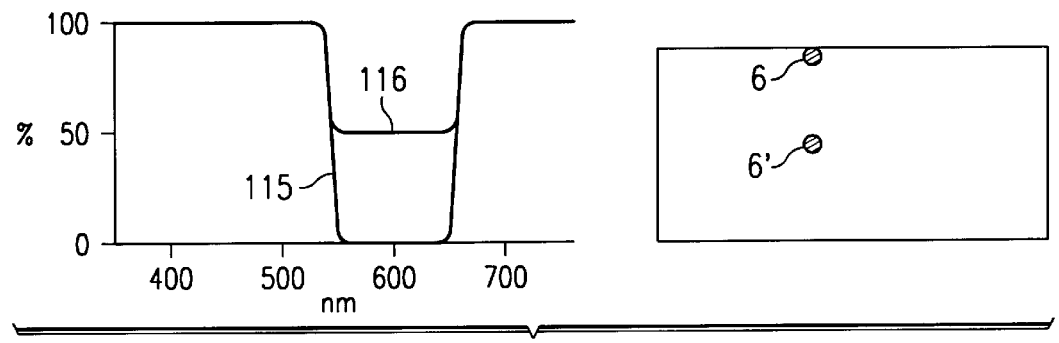

FIG. 3G shows the spot of light 6 at a third location along the hue axis and spot 6' at a corresponding location displaced along the saturation axis. The color of light transmitted through the filter plate at spot 6 is represented by spectral response curve 115, which shows a narrow band of approximately 0% transmittance approximately centered around 600 nm, transmittance outside the band being nearly 100%. The color of light transmitted through the filter plate a spot 6' is represented by spectral response curve 116, which shows a narrow band of approximately 50% transmittance approximately centered around 600 nm, but with approximately 100% transmittance of other wavelengths outside the band.

Figure 3H:
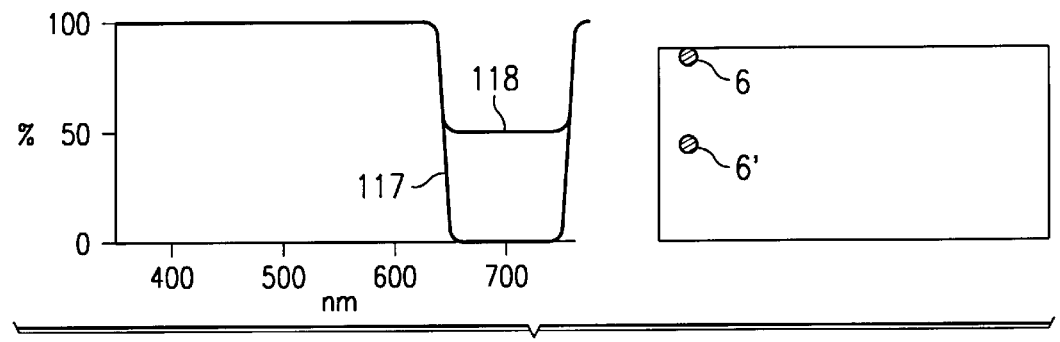

FIG. 3H shows the spot of light 6 at a fourth location along the hue axis and spot 6' at a corresponding location displaced along the saturation axis. The color of light transmitted through the filter plate at spot 6 is represented by spectral response curve 117, which shows a narrow band of approximately 0% transmittance approximately centered around 700 nm, transmittance outside the band being nearly 100%. The color of light transmitted through the filter plate a spot 6' is represented by spectral response curve 118, which shows a narrow band of approximately 50% transmittance approximately centered around 700 nm, but with approximately 100% transmittance of other wavelengths outside the band.

Filters of this type are distinguished from short-wave pass or long-wave pass edge filters, such as those disclosed in U.S. Pat. No. 4,602,321 or U.S. Pat. No. 4,800,474; or those disclosed in U.S. Pat. No. 5,282,121 or U.S. Pat. No. 5,426,576; in that the filters of the preferred embodiment exhibit a cut-on wavelength characteristic and a cut-off wavelength characteristic within the visible band of the electromagnetic spectrum throughout most of the various positions of the filter, and generally do not exhibit another cut-on or cut-off wavelength characteristic within the visible band. Thus, a controlled band-width filter of the band-pass or band-reject type is formed, the filter having no secondary complex characteristic such as described in U.S. Pat. No. 5,426,576. Nevertheless, the band-reject filter may exhibit edge filter behavior at either end of the visible range if a boundary of the reject band passes into the non-visible range.

Figure 11:
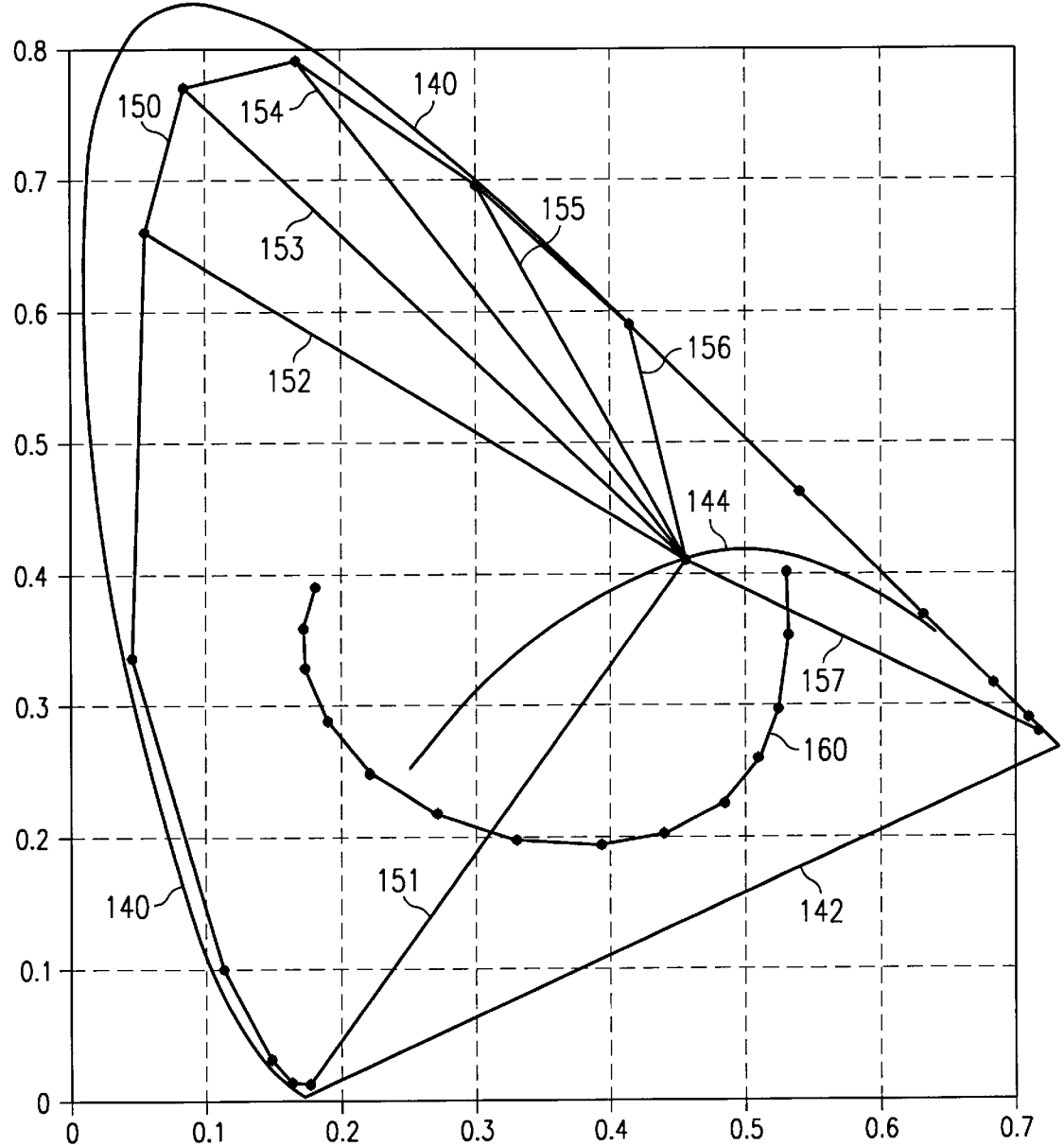
FIG. 11 illustrates a chromaticity diagram showing the range of colors produced by the two sequential filters.

A variable band pass filter having a narrow band width of 10% or less of the center wavelength, such as the color filter plate 7, produces all of the colors of the rainbow in their natural order of red-orange-yellow-green-blue-indigo-violet, a sequence that is natural and pleasing to the eye as the filter plate is moved along the hue axis. Other systems using variable edge filters do not demonstrate such a wide variation in perceived color nor is the color change as natural looking. Variable long wave pass filters can only change from red to orange to yellow, and variable short wave pass filters can only change from blue to blue-green to light blue-green. As shown in FIG. 11, a narrow band pass filter produces a range of colors of extremely pure quality, as a locus 150 of saturated colors plotted on the CIE 1931 (x,y) Chromaticity Diagram lies in the color domain near the boundary 140 that represents single-wavelength colors. The saturation gradient produced by the spatial modulation of the filter coating allows coverage of all of the color space within the color locus, particularly the region bounded by the locus 150 of saturated colors and the lines 151 and 157. Lines 151–157 represent separate loci of points, each locus representing a range of variable saturation characteristics with a constant hue characteristic. The boundary 142 represents complex colors such as magenta and purple, while the curve 144 represents the black body radiation curve.

A variable band reject (or "notch") filter having a relatively small reject band of between 10% and about 30%, and having both edges predominantly in the visible band, such as the color filter plate 8, produces a wide range of pinks, magentus, purples and lavenders. The range of colors obtained by the band reject filter is represented in FIG. 11 by the curve 160. The two extremes of the notch revert to long-wave-pass and short-wave-pass (edge filter) characteristics forming regions of yellow or light blue, respectively. This edge filter behavior at the extremes of hue axis provide yellow or light blue colors which are not prevalent in the rainbow (and therefor not selectable by the band pass filter) but are very important in stage lighting.

The pattern can be formed in the filter coating by masking the substrate during application of the filter coating to the substrate. Alternatively, a pattern can be formed in the filter coating by a laser ablation process, such as described in co-pending U.S. Pat. No. 5,728,994, hereby incorporated by reference. Further, alternatively, a chemical photoetching process can be used to form the pattern.

In a typical application, the goal may be to illuminate a small spot on the color filter plate with a light beam having a narrow illumination cone and obtain a five nanometer shift in center wavelength along the hue gradient axis passing through the spot. A typical optical system may have a beam divergence angle of 10 degrees and project a spot of light 3½ feet (106 cm) in diameter at a distance of 20 feet (6.07 m). The same optical system may have a field divergence angle of 20 degrees and project a pool of light 7.8 feet (2.4 m) in diameter at 20 feet (6.07 m). It is desirable that the perceived hue of the light be the same across the diameter of the spot or pool. A narrow illumination cone is therefore desired to minimize hue gradient across the spot due to variations in angle of incidence of the light rays upon the filter. As is well-known in the art, small angles of incidence below approximately 30 degrees introduce only disproportionately small shifts in center wavelength, but angles of incidence of 45 degrees or greater produce noticeable hue variations. A small spot size is also desired to minimize hue gradient across the spot due to the variable dielectric thin-film coating.

Figure 4:
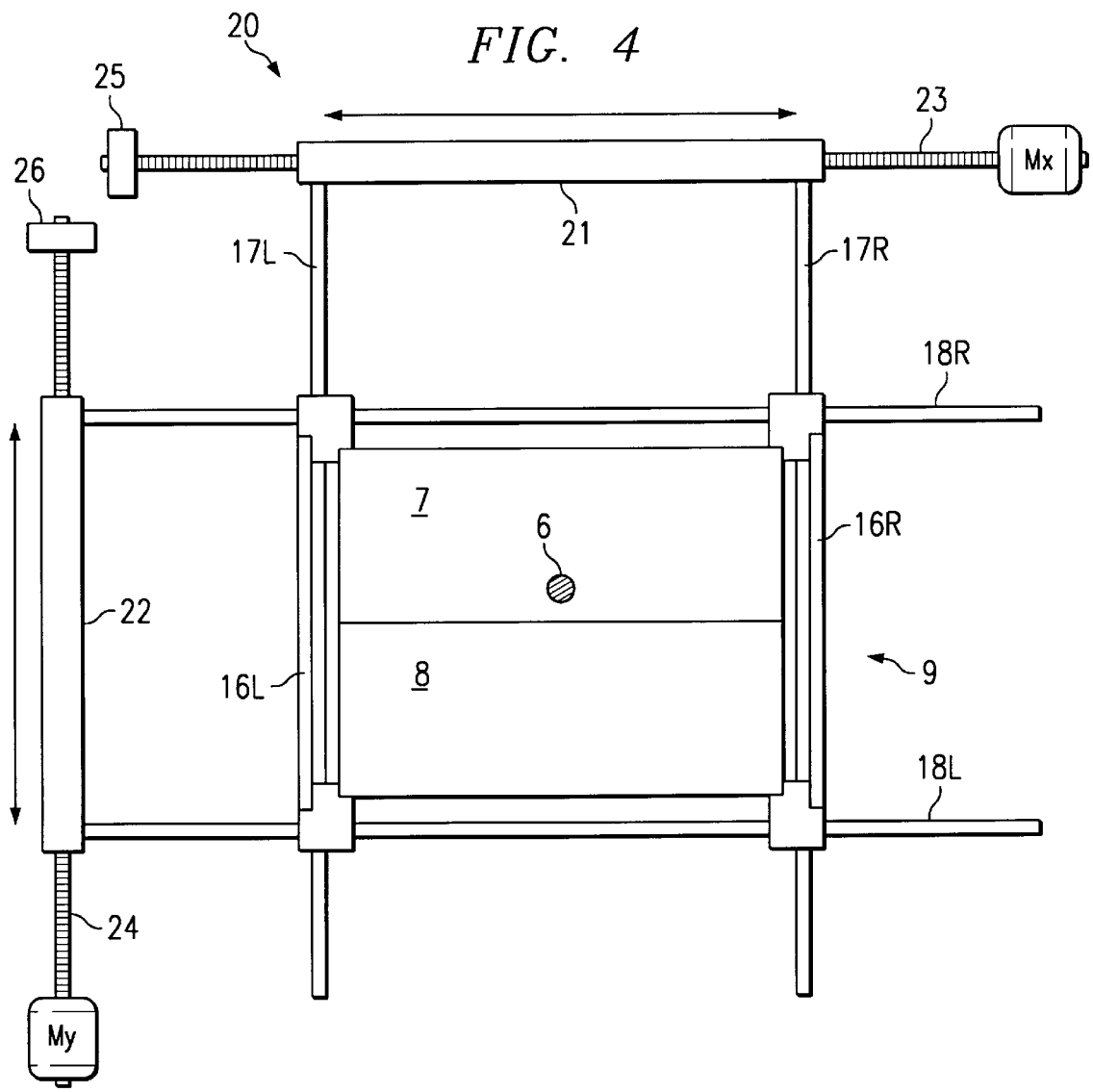
FIG. 4 is schematic front elevation of a color filter mechanism according to a first embodiment.

One possible mechanism 20 for translating a color filter plate in two orthogonal axes is shown in FIG. 4. In a first embodiment, a filter plate assembly 9, comprising band-pass filter 7 and band-reject filter 8 mounted abutting edge-to-edge in a plane such that areas of maximum saturation on filter 7 and on filter 8 abut, is supported by brackets 16L and 16R. Alternatively, filter plate assembly 9 may comprise a single transparent substrate having a band-pass filter coating applied to one portion thereof, and having a band-reject filter coating applied to a second portion thereof, each of the portions having been masked during application of a filter coating to the other portion. The brackets are supported by two pair of parallel rails or slides 17L, 17R and 18L, 18R. Each pair of parallel slides is coupled by an assembly 21, 22 housing ball nuts (not shown) at either end thereof. Each ball nut housing 21, 22 rides on a lead screw 23, 24 which is rotatable by a motor Mx or My and supported by bearings 25, 26. The mechanism is positioned in the optical system so as to intercept a light beam forming an illuminated spot 6 on one or the other color filter plate, depending upon the position of the carriage. In operation, motor Mx can be energized in a forward or reverse direction to translate the color filter carriage along an X axis and motor My can be similarly energized to translate the carriage along a Y axis. The two motors can be energized singly or simultaneously as desired to control the position of the illuminated spot on the color filter assembly. A rack-and-pinion drive arrangement can be used instead of lead-screw arrangement. Dual-axis translation mechanisms are well known and are shown, for example, in U.S. Pat. No. 5,311,791 to Yanagisawa, which is hereby incorporated by reference.

In operation, motor Mx is energized to control the hue characteristic of a light beam transmitted through the filter assembly while motor My is energized to control the saturation characteristic of the light beam. In a first embodiment, areas of maximum saturation on filter 7 and on filter 8 abut, and motor My drives the filter assembly to position areas of greater or lesser filter density in the beam path, further driving the filter assembly completely out of the beam path to obtain unfiltered white light.

As shown in FIG. 5, a color filter plate 30 according to a second embodiment, comprises a generally circular transparent substrate 31 having a hole 32 formed in the center thereof, with spatially-modulated, multi-layer, thin-film, dielectric coatings deposited on the substrate to form interference or dichroic filters. A first portion 33 of the filter plate has a continuously-varied or substantially continuously varied band pass (CVBP) dichroic filter coating and a second portion 34 thereof has a continuously-varied or substantially continuously varied band reject (CVBR) dichroic filter, each of the filter coatings having a continuously-variable or substantially continuously variable hue characteristic along a first gradient axis 35 of the plate and having continuously-variable or substantially continuously variable saturation characteristic along a second gradient axis 36 of the plate. In this circular aspect, the first (hue) gradient axis 35 extends annularly around the plate while the second (saturation) gradient axis 36 extends radially from a central portion to a peripheral portion of the plate. In a preferred embodiment, areas of maximum filter density are arranged peripherally about the circumference of the circular filter plate, and the filter density decreases radially towards more central regions of the filter plate. Alternatively, the areas of maximum filter density could be arranged annularly about a central region of the plate, with the filter density decreasing radially towards peripheral regions of the plate. The circular filter plate can be mounted in a carriage movable in at least one axis of a plane, the filter plate also being rotatable about an axis of rotation. The plane of movement is preferably normal to the axis of a light beam passing through the plane of the filter plate and the axis of rotation is approximately parallel to the axis of the light beam. The circular filter plate may be a single piece or, for convenience of manufacture, may be formed of two pieces mounted abutting.

One possible mechanism for translating and rotating the circular filter plate 30, as shown in FIG. 5, is adapted from the two-axis orthogonal translation mechanism shown in FIG. 4, and comprises a set of roller bearings 37–40 supporting the filter plate, a pair of brackets 41, 42 supporting the roller bearings, a pair of rails 43, 44 supporting the brackets, a first drive arrangement including a reversible electric motor 45 coupled to a lead screw 46 passing through a ball nut housing 47, which is coupled to the rails 43, 44, the lead screw being supported at a distal end by bearing 48; the mechanism further comprising a second drive arrangement including a reversible electric motor 491 having a drive pulley 50 mounted to the motor shaft 51, and a drive belt 52 coupling the drive pulley to a driven pulley 53 integral with or coupled to one of the roller bearings 40.

In operation, circular filter plate 30 is rotated to position an area of the filter coating having a desired hue characteristic in the beam path, and is translated laterally to position an area having a desired filter density in the beam path. The filter may be translated to position the central hole 32 in the beam path to obtain un-filtered white light. The motors 45 and 49 can be energized individually or simultaneously, in either a forward or reverse direction as desired to translate and/or rotate the circular filter plate 30 so as to position the spot of light 6 at any desired location on the filter plate or to position the spot in the central hole 32.

A circular filter plate according to the second embodiment described above minimizes space requirements within a luminaire housing since one of the axes of lateral translation is eliminated, being replaced instead by rotation of the filter plate as the hue gradient axis now describes an arc about the axis of rotation. The circular filter plate is translated along the remaining axis of lateral translation as the saturation gradient axis of the filter lies radially along the filter surface where the beam intersects the filter. The swept volume of the color filter mechanism is thereby minimized.

According to a further embodiment shown in FIG. 6, another optical system 60 for a spot luminaire is identical to the system shown in FIG. 1 except that color filter plates 7 and 8 are arranged sequentially along optical axis OA, with band reject filter plate 8 being located closer to the light source 1 and with band pass filter plate 7 being located closer to the lens 3. The filter plates are each mounted in separate two-axis translation mechanisms 20, or XY drives, such as the type shown for example in FIG. 4. Alternatively, the two filter plates may be formed on separate generally circular transparent substrates 31, such as shown for example in FIG. 5, except that the first (hue) gradient axis 35 may extend substantially fully annularly around the plate. Since this can be difficult to manufacture, two semi-circular plates can be used. Two circular filter plates or two semi-circular plates may be mounted in separate translation and rotation mechanisms 30, such as shown for example in FIG. 5. It should be understood that two motors are required to drive each filter plate, so that four motors are required to operate a color filter mechanism having two sequential filter plates. The motors can be energized singly or in combination as desired to control the position of an illuminated spot on either or both filter plates. Two such filter plates, either rectangular or circular, and in sequential arrangement, permit additional color control as the spectral response characteristics of one filter modify the spectral response characteristics of the other filter to obtain a combined spectral response characteristic.

Referring now to FIGS. 7A–7C, band pass filter plate 7 and band reject filter plate 8 can be positioned with respect to the spot of light 6, as shown in FIG. 7C. The spectral response of band pass filter plate 7 is represented in FIG. 7A as the curve 121, which shows a narrow band of transmitted wavelengths centered around 400 nm and a "white light floor" of about 25%. Transmittance inside the band is about 100% while transmittance outside the band is about 25%. The spectral response of band reject filter plate 8 is represented in FIG. 7A as the curve 122, which shows a band of ejected wavelengths centered around 700 nm. Transmittance inside the band is nearly 0% while transmittance outside the band is about 100%. The composite spectral response of the two filter plates in series is represented in FIG. 7B as the curve 123, which shows a narrow band of nearly 100% transmittance centered around 400 nm, and a white light floor of about 25% except in a band of rejected wavelengths centered around 700 nm. The composite spectral response represented by the curve 123 is basically the response curve 121 of band pass filter plate 7 positioned as shown in FIG. 7C but with the long-wavelength end cut off due to the action of band reject filter plate 8 in the position shown, which passes essentially all of the wavelengths from about 350 nm to about 630 nm and rejects nearly all of the wavelengths between about 630 nm and 880 nm. Band pass filter plate 7 then rejects about 75% of the wavelengths passed by filter plate 8 except in the pass band, which transmits about 100% of the wavelengths between 380 nm and 420 nm.

Referring now to FIGS. 8A–8C, band pass filter plate 7 and band reject filter plate 8 can be positioned with respect to the spot of light 6, as shown in FIG. 8C. The spectral response of band pass filter plate 7 is represented in FIG. 8A as the curve 124, which shows a narrow band of transmitted wavelengths centered around 600 nm and a "white light floor" of about 50%. Transmittance inside the band is about 100% while transmittance outside the band is about 50%. The spectral response of band reject filter plate 8 is represented in FIG. 8A as the curve 125, which shows a band of rejected wavelengths centered around 500 nm. Transmittance inside the band is about 50% while transmittance outside the band is nearly 100%. The composite spectral response of the two filter plates in series is represented in FIG. 8B as the curve 126, which shows a narrow band of nearly 100% transmittance centered around 600 nm, and a white light floor of about 50% except in a band of rejected wavelengths centered around 500 nm. The composite spectral response represented by the curve 126 is basically the response curve 124 of band pass filter plate 7 positioned as shown in FIG. 8C but with the reduced transmittance in the reject band due to the action of band reject filter plate 8 in the position shown, which passes essentially all of the wavelengths from about 350 nm to about 450 nm, and from about 550 nm to about 750 nm, and attenuating wavelengths from about 450 nm to about 550 nm. Band pass filter plate 7 then rejects about 50% of the wavelengths passed by filter plate 8 except in the pass band, which transmits about 100% of the wavelengths between about 570 nm and about 630 nm.

Figure 9A:
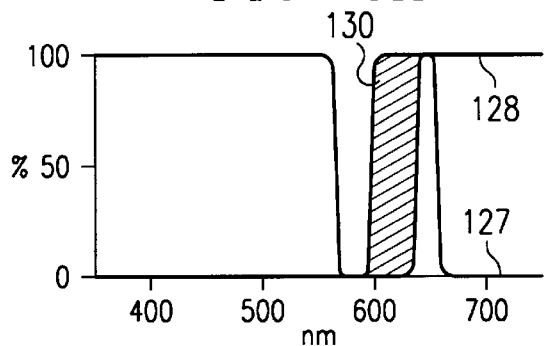
FIGS. 9A–9C and 10A–10C illustrate the composite spectral response of two sequential filters and the relative positions thereof.
Figure 9B:
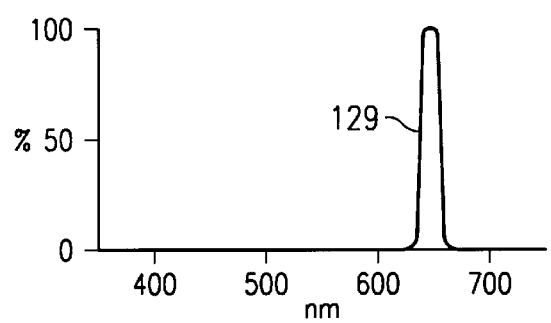
Figure 9C:
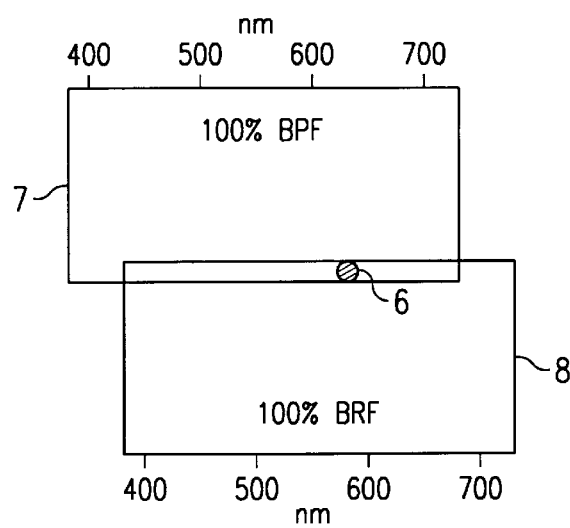

Referring now to FIGS. 9A–9C band pass filter plate 7 and band reject filter plate 8 can be positioned with respect to the spot of light 6, as shown in FIG. 9C. The spectral response of band pass filter plate 7 is represented in FIG. 9A as the curve 127, which shows a narrow band of transmitted wavelengths centered around 625 nm. Transmittance inside the band is about 100% while transmittance outside the band is about 0%. As the band width of the band pass filter, in this illustration, is about 10% of the center wavelength or about 62 nm wide, the pass band ranges from about 593 nm to about 656 nm. The spectral response of filter plate 8 is represented in FIG. 9A as the curve 128, which shows a band of rejected wavelengths centered around 600 nm. Transmittance inside the band is about 0% while transmittance outside the band is nearly 100%. As the band width of the band reject filter, in this illustration, is about 20% of the center wavelength, the reject band ranges from about 570 nm to about 630 mm. The composite spectral response of the two filter plates in series is represented in FIG. 9B as the curve 129, which shows a very narrow band of wavelengths ranged from about 630 nm to about 656 nm. The composite spectral response represented by the curve 129 is basically the response curve 127 of band pass filter plate 7 positioned as shown but with reduced transmittance in the region 130 as shown in FIG. 9A due to the action of band reject filter plate 8 in the position shown. The position of filter plate 8 has been adjusted so that its reject band partially overlaps the pass band of filter plate 7 having the effect that the composite pass band of the two filter plates in series is made more narrow than the pass band of filter plate 7 itself.

Figure 10C:
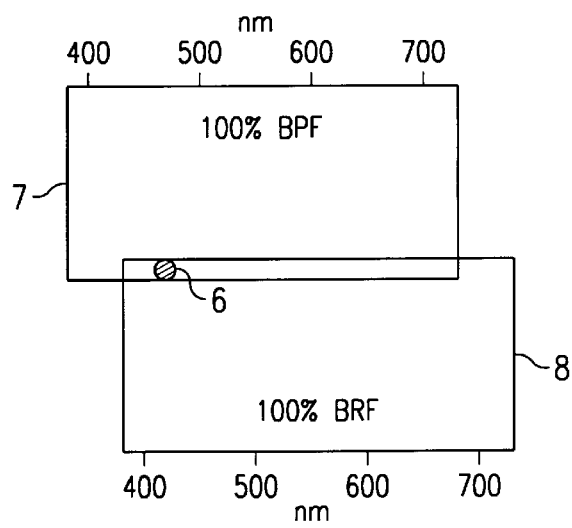
Figure 10A:
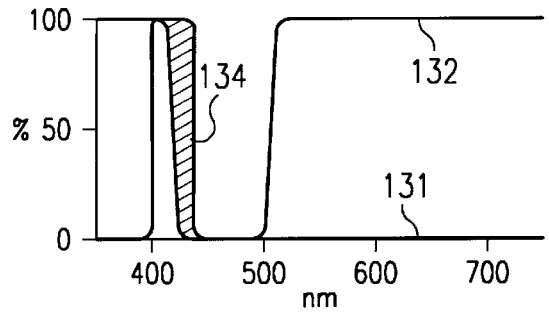
Figure 10B:
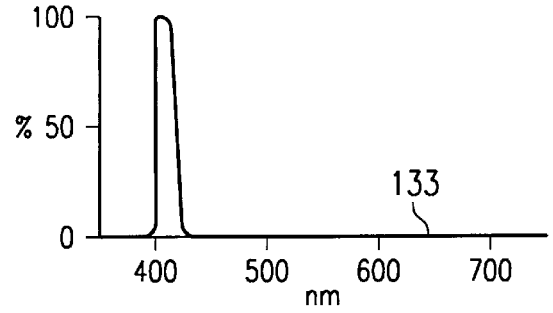

Referring now to FIGS. 10A–10C, band pass filter plate 7 and band reject filter plate 8 can be positioned with respect to the spot of light 6, as shown in FIG. 10C. The spectral response of band pass filter plate 7 is represented in FIG. 10A as the curve 131, which shows a narrow band of transmitted wavelengths centered around 425 nm. Transmittance inside the band is about 100% while transmittance outside the band is about 0%. The width of the pass band is about 10% of the center wavelength, or about 42 nm wide, and ranges from about 404 nm to about 446 nm. The spectral response of band reject filter plate 8 is represented in FIG. 9A and the curve 132, which shows a band of rejected wavelengths centered around 470 nm. Transmittance inside the band is about 0% while transmittance outside the band is nearly 100%. The width of the reject band is about 20% of the center wavelengths, or about 94 nm, and ranges from about 423 nm to about 517 nm. The composite spectral response of the two filter plates in series is represented in FIG. 10B as the curve 133, which shows a very narrow band of transmitted wavelengths ranged from about 404 nm to about 423 nm. The composite spectral response represented by the curve 133 is basically the response curve 131 of band pass filter plate 7 positioned as shown but with reduced transmission in the region 134 as shown in FIG. 10A due to the action of band reject filter plate 8 in the position shown. The position of filter plate 8 has again been adjusted so that its reject band partially overlaps the pass band of filter plate 7 having the effect that the composite pass band of the two filter plates in series is made more narrow than the pass band of filter plate 7 itself.

It should be appreciated that, for any point along a composite spectral response curve 123 or 126 such as shown for example in FIG. 7C or in FIG. 8C, the transmittance value at a certain wavelength is the product of the transmittance values at the corresponding wavelength of each of the curves 121 or 124 and 122 or 125 such as shown for example in FIG. 7A or in FIG. 8A. Referring again to FIG. 8B, the transmittance value at 500 nm is the product of 50%×50%= 25%; in that band pass filter plate 7 reduces transmittance by 50% at that wavelength and band reject filter plate 8 reduces transmittance by 50% of that at the same wavelength, the cumulative effect being that transmittance through the two filter plates in series is about 25% at 500 nm with the filter plates in the positions shown in FIG. 8C.

It should also be appreciated by now that a wide variety of relatively complex spectral responses can be obtained from two such continuously-variable sequentially-arranged filter plates mounted from two-axis translation as hereinbefore described. A non-structured or stochastic pattern of ovoid or polygonal dots that are randomly sized, shaped, oriented, and/or arranged can be formed in the filter coatings to avoid generation of moire patterns when the two filters are used sequentially. The additional color range achieved by the use of the variable band pass and variable band reject filters in sequence is difficult to illustrate on the CIE Chromaticity Diagram, but this additional range allows the sequential color plate apparatus to match the important light tints or pastel colors used in theatrical lighting in addition to providing a wide range of saturated colors. The combination of the two filters working in their lower saturation ranges allows one to fine tune a given color by adjusting the second filter to make small changes in the first color.

One other particular advantage obtained by independent operation of two sequential rectangular filter plates is that a color cross-fade between a first filter plate and a second filter plate can be executed by staging the second plate out of the beam path but with the desired hue aligned with the beam path, and then translating the two filter plates along one axis of movement, corresponding to the saturation axis, so that the color produced by the first filter plate fades-out to white while the color produced by the second filter plate fades-in from white with no intervening hues being noticeable.

In an alternative embodiment using generally circular filter plates, a greater potential for miniaturization exists since the hue gradient axis at maximum saturation can be made to extend annularly about the periphery of the plate; the circumference of a circle of a given diameter being greater than the axial length of a rectangular plate whose length is equal to the diameter of the circular plate. This additional length can be used to provide greater resolution for positioning a spot of light on a desired point in the highly-saturated peripheral region or, conversely, the diameter of the filter plate can be reduced to about one-third of the axial length of a rectangular filter plate having an axial length equivalent to the circumference of the circular plate. Plainly, one can wrap a hue gradient axis of a given length around the periphery of a circular filter plate having substantially smaller diameter than the axial length required of a corresponding rectangular filter plate.

Another advantage of using circular plates is that the color filter mechanism can be more easily operated so as to fade through white going between colors, by translation and rotation of the color filter plates, and shortens the time required for some color changes as translation "short-cuts" through the central region of the circular plate as opposed to rotating the plate along the arcuate hue gradient axis and making only minor translational moves to adjust for desired saturation; thereby offering an additional creative dynamic effect to a lighting designer.

Although several embodiments of the invention have been illustrated and/or discussed, it will be understood that the invention is not limited to the specific embodiments disclosed, but is capable of numerous rearrangements and modifications without departing from the spirit of the invention.

We claim:

1. A color filter mechanism comprising:

a first color filter plate comprising a transparent substrate supporting a first spatially-modulated, continuously-variable interference filter coating on a surface thereof, said coating exhibiting a continuously-variable band pass hue characteristic along a first gradient axis thereof, said first coating exhibiting a continuously-variable saturation characteristic along a second gradient axis thereof;

a first carriage supporting said first color filter plate, said first carriage being movable in two directions relative to said surface;

a second color filter plate comprising a transparent substrate supporting a second spatially-modulated, continuously-variable interference filter coating on a surface thereof, said second coating exhibiting a continuously-variable band reject hue characteristic along a first gradient axis thereof, said coating exhibiting a continuously-variable saturation characteristic along a second gradient axis thereof; and a second carriage supporting said second color filter plate in a sequential arrangement relative to said first color filter plate, said second carriage being movable in two directions relative to said surface.

2. A color filter mechanism according to claim 1, wherein said first and second coatings comprise multi-layer, thin-film dielectric interference filters, the various layers thereof having a continuously-varied thickness along said first gradient axes.

3. A color filter mechanism according to claim 1, wherein said first and second coatings having a pattern formed therein, said pattern having a continuously-varied density along said second gradient axes.

4. A color filter mechanism according to claim 3, wherein said pattern comprises a stochastic pattern of randomly sized dots.

5. A color filter mechanism according to claim 3, wherein said pattern comprises a stochastic pattern of randomly arranged dots.

6. A color filter mechanism according to claim 3, wherein said pattern comprises a stochastic pattern of randomly sized polygons.

7. A color filter mechanism according to claim 3, wherein said pattern comprises a stochastic pattern of randomly arranged polygons.

8. A color filter mechanism according to claim 1, wherein said first and second color plates are generally rectangular.

9. A color filter mechanism according to claim 5, wherein both of said two directions are linear.

10. A color filter mechanism according to claim 1, wherein said first and second color filter plates are generally circular.

11. A color filter mechanism according to claim 10, wherein one of said directions is linear and the other of said directions is arcuate.

12. A light projection system comprising:

a lamp coupled with a reflector such that when said lamp is energized, said lamp and reflector form a visible light beam focused upon a focal point;

a first color filter plate mounted near said focal point, said first color filter plate comprising a transparent substrate supporting a first spatially-modulated, continuously-variable interference filter coating on a surface thereof, said first coating exhibiting a band pass hue characteristic that varies along a first gradient axis thereof, said coating exhibiting a saturation characteristic that varies along a second gradient axis thereof;

a first carriage supporting said first color filter plate, said first carriage being movable in two directions relative to said surface;

a second color filter plate mounted near said focal point, said color filter plate comprising a transparent substrate supporting a second spatially-modulated, continuously-variable interference filter coating on a surface thereof, said second coating exhibiting a band reject hue characteristic that varies along a first gradient axis thereof, said second coating exhibiting a continuously-variable saturation characteristic along a second gradient axis thereof;

a second carriage supporting said second color filter plate in a sequentially arrangement relative to said first color filter plate, said second carriage being moveable in two directions relative to said surface; and a lens disposed downstream of said color filter plates.

13. A light projection system according to claim 12, wherein said color filter plates are generally rectangular.

14. A light projection system according to claim 13, wherein said carriages are movable in two linear directions.

15. A light projection system according to claim 12, wherein said color filter plates are generally circular.

16. A light projection system according to claim 15, wherein said color filter plates are movable in a linear direction and an arcuate direction.

17. A light projection system according to claim 12, further comprising a motor drive coupled to each said carriage.

* * * * *